United States Patent [19]
Anderson et al.

[11] Patent Number: 5,884,289
[45] Date of Patent: Mar. 16, 1999

[54] DEBIT CARD FRAUD DETECTION AND CONTROL SYSTEM

[75] Inventors: Douglas D. Anderson; Mary E. Anderson, both of Cape May, N.J.; Carol Oman Urban; Richard H. Urban, both of Alexandria, Va.

[73] Assignee: Card Alert Services, Inc., Arlington, Va.

[21] Appl. No.: 662,638

[22] Filed: Jun. 14, 1996

Related U.S. Application Data

[60] Provisional application No. 60/000,285, Jun. 16, 1995.
[51] Int. Cl.$^6$ .................................................. G06F 17/60
[52] U.S. Cl. ........................ 705/44; 705/1; 705/41; 705/44; 235/380; 235/382.5
[58] Field of Search .................................. 705/1, 41, 44; 364/400; 235/440, 380, 382; 340/825.31; 379/144, 91.01

[56] References Cited

U.S. PATENT DOCUMENTS

| | | | |
|---|---|---|---|
| 3,790,754 | 2/1974 | Black et al. ............................ | 235/380 |
| 4,013,894 | 3/1977 | Foote et al. ............................ | 250/569 |
| 4,628,195 | 12/1986 | Baus ....................................... | 235/440 |
| 4,707,592 | 11/1987 | Ware ....................................... | 235/379 |
| 4,775,784 | 10/1988 | Stark ....................................... | 235/380 |
| 5,162,638 | 11/1992 | Diehl et al. ............................. | 235/380 |
| 5,278,538 | 1/1994 | Ainsworth et al. ...................... | 380/23 |
| 5,311,594 | 5/1994 | Penzias .................................... | 380/23 |
| 5,365,046 | 11/1994 | Haymann ................................ | 235/380 |
| 5,566,234 | 10/1996 | Reed et al. .............................. | 379/188 |
| 5,613,012 | 3/1997 | Hoffman et al. ........................ | 382/115 |
| 5,627,886 | 5/1997 | Bowman ................................. | 379/111 |
| 5,652,421 | 7/1997 | Veeneman et al. ..................... | 235/381 |
| 5,727,163 | 3/1998 | Bezos ....................................... | 705/27 |

*Primary Examiner*—Allen R. MacDonald
*Assistant Examiner*—Romain Jeanty
*Attorney, Agent, or Firm*—Whitham, Curtis & Whitham

[57] ABSTRACT

A computer based system that alerts financial institutions (FIs) to undetected multiple debit card fraud conditions in their debit card bases by scanning and analyzing cardholder debit fraud information entered by financial institution (FI) participants. The result of this analysis is the possible identification of cardholders who have been defrauded but have not yet realized it, so they are "at risk" of additional fraudulent transactions. The system also identifies "at risk" cards in the criminal's possession which have not yet been used. The system's early identification of these "at risk" cardholders helps limit losses to individual FIs and the FI community at large. It also provides the coordinated information necessary to the speedy apprehension of the perpetrators.

13 Claims, 12 Drawing Sheets

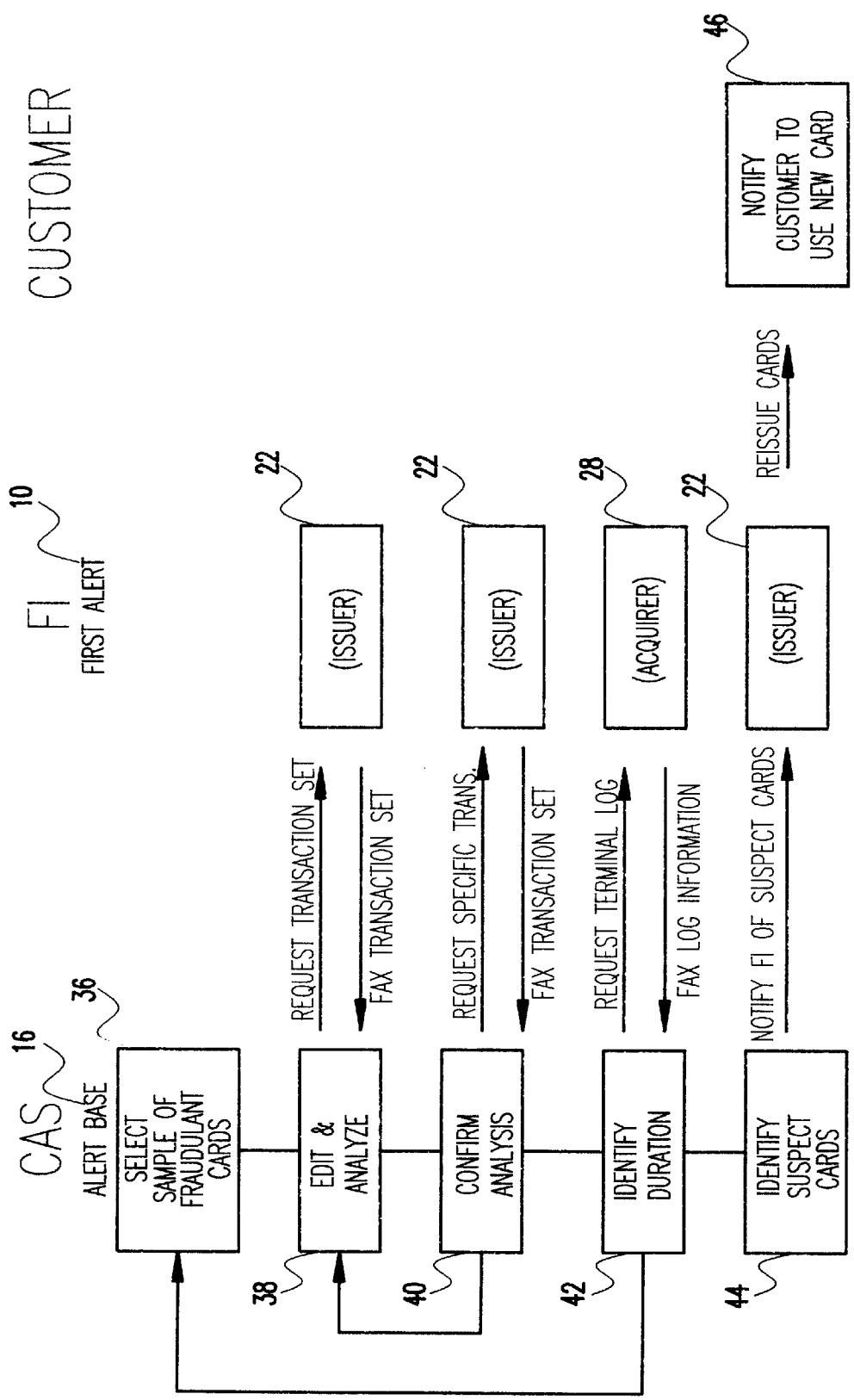

DEBIT CARD FRAUD DETECTION AND CONTROL SYSTEM

CROSS REFERENCE TO RELATED APPLICATIONS

This application is a continuation in part and claims priority to provisional application Ser. No. 60/000,285, filed Jun. 16, 1995, the complete contents of which are herein incorporated by reference.

BACKGROUND OF THE INVENTION

1. Field of the Invention

The present invention relates to a computer system that facilitates the detection and control of counterfeit debit card fraud in a multi-institution environment.

2. Description of the Prior Art

A. BACKGROUND

Over the past 20 years banks and other financial services organizations have been developing and implementing electronic on-line systems to better serve their retail customers. These systems have involved an access device, usually a magnetic-striped card and an associated personal identification number (PIN), issued to customers by their financial institution (FI). These access devices, often called debit cards, can then be used by customers in automated teller machines (ATMs) and more recently in point of sale (POS) terminals to gain access to their accounts for the withdrawal of funds in the form of cash or goods and services. For distribution and economic reasons, FIs began sharing usage on both the systems with the ATM and POS terminals used to gain entry to the systems. This shared environment has grown to the point where 100s of millions of transactions worth 10s of billions dollars flow through it each month. This has translated into a real convenience for FI customers and a business success for the industry. However, as the volume of dollars moved by these services has grown, more attention is being focused on the potential security threats, particularly fraud. Debit card fraud is increasing, and the potential for more and larger losses is significant. The industry has inadequate technical solutions in place to prevent this fraud and lacks a monitoring system for its early detection. Known technological solutions (described below) for significantly reducing this risk are expensive and several years away from implementation. The debit card industry risks not only theft losses but also potentially is exposed to loss of consumer confidence and consequent dramatic reductions in card usage and attendant revenues.

B. CURRENT SOLUTIONS

The industry is focused today on technology solutions that improve the security of the card or modify the information available from the system. For these solutions to be truly effective, they must be implemented system-wide. They are categorized below into three distinct stages based on their implementation horizon.

Long-term: Smart card technology, with its multiple-level protocol capabilities for cardholder identification, has the potential to be more secure than magnetic stripe technology. However, it probably will be at least ten years before smart cards are implemented industry-wide. It will still be necessary to secure the magnetic stripe, therefore, since the two technologies will coexist on the same card during that interim period, the magnetic stripe serving as the primary means to transfer value from a deposit account onto the chip.

Medium-term: Several technologies have been developed specifically to address magnetic stripe counterfeit fraud. Watermark technology appears to work, but is very expensive to implement because it requires the complete reissuance of all cards. "Physical-card-characteristic" technologies like X-tec's "magnetic signature" are very promising in that they do not require card reissuance, but they still have to be validated and then will require up to five years or longer to implement.

Short-term: Truncation of the card number on the customer's printed terminal receipt was recently approved by the Federal Reserve. This change is currently being implemented by terminal owners and processors and should be complete in the next 12 to 18 months.

C. COUNTERFEIT DEBIT FRAUD

The following description of counterfeit debit fraud will differentiate it from traditional debit card fraud and provide a basis to better understand the invention and its attributes versus existing and proposed solutions.

Traditional fraud involves one cardholder and one bank issuer. Counterfeit fraud involves an unknown number of banks and an unknown number of their respective cardholders. It is this unknown extent of the counterfeit debit fraud that makes the threat so menacing. Once a scam is discovered, it is often difficult to ascertain whether the problem is a minor one, or a major one.

Using a disease analogy, traditional fraud can be compared to a wound; when the cardholder reports the fraud, the bank has a good reading on its dimension and the necessary treatment. The dimension is the amount reported by the cardholder as missing, and the treatment is to status the card and research the transactions involved. Counterfeit fraud, however, like a disease, is often mis-diagnosed and treated as a wound, which allows it to spread unchecked among other segments of the bank's card base, as well as to those of other institutions, until it is finally uncovered. It was the inventors' approach to view counterfeit debit card fraud as a disease rather than a wound that led to the invention.

Debit card counterfeit fraud is a two-part crime. In the first part, access to the account is compromised, in the second, funds are stolen. The first part leaves no obvious physical trail, but it is the key to determining the dimension of the fraud. The second part of the crime, the theft of funds, separated in time from the first part and resembling traditional fraud, may be misdiagnosed, and hence mis-treated, unless information on its incidence is shared and matched with other incidences.

The following scenarios are composites of a number of cases reviewed by the inventors. They are not intended to describe any specific case. They are presented to illustrate the levels of compromise, how criminals adapt their techniques, and how the risk escalates. The following terms are used in describing this "evolution of a fraud:"

1) "Point of compromise"—the ATM or POS terminal where the access information (card number and PIN) are compromised.
2) "Point of fraud"—the ATM or POS terminal where the fraudulent card is used to withdraw cash or purchase merchandise.
3) Cards in "play"—compromised cards currently being used at terminals to defraud customers and their banks.
4) Cards in "inventory"—cards that have been compromised but not yet put in "play"

In these scenarios, the fraud evolves in a typical market where approximately 50% of the debit cards are exposed to "shoulder-surfing" (fraudulent cards can be produced from receipts).

Level 1 compromise—An individual standing near the terminal observes the entry of a customer's PIN and recovers the discarded receipt. The criminal uses the receipt information to encode a card and then defrauds the customer's account. The typical point of compromise is an ATM or POS terminal. The typical point of fraud is an ATM without a camera. While 50% of the cards are at risk, cardholders are wary of someone observing them entering their PINs and, therefore, are less likely to discard the receipts. The yield to the criminal may be three to seven fraudulent cards per 100 transactions; the potential—tens to hundreds of cards.

Level 2 compromise—The criminal, in a nearby parked van, uses a pair of field glasses or a video camera with a zoom lens to observe the entry of the PIN and recovers the customer's discarded receipt. The criminal uses the receipt information to encode a card and then defrauds the customer's account. Again, the typical point of compromise is an ATM or POS terminal, and the typical point of fraud is an ATM without a camera. While the same 50% of cards are at risk, the cardholders do not realize they are being observed entering their PINs and are more likely to discard receipts. Thus, the yield goes up—perhaps to 8 to 15 fraudulent cards per 100 transactions; the potential—hundreds to thousands of cards.

Level 3 compromise—The criminal uses a video camera to observe the entry of customers' PINs and colludes with a store clerk to gain access to the store's copy of customer receipts. The criminal uses the receipt information to encode cards and defrauds the customers' accounts. The typical point of compromise is a POS terminal. The typical point of fraud is an ATM without a camera. While 50% of the cards are at risk, the camera is likely in a fixed position and will not be able to "see" every PIN entry. The yield to the crook may be 16 to 35 fraudulent cards per 100; the potential— thousands to tens of thousands of cards.

Level 4 compromise—The criminal uses a video camera to observe the entry of customers' PINs, and the magnetic stripe data is "skimmed" from a tapped phone line or a secondary collection device. The criminal uses the skimmed information to encode cards and defrauds customers' accounts. The typical point of compromise is a POS terminal. The typical point of fraud is an ATM without a camera. While 100% of the cards are at risk, the camera will not be able to record every PIN. The yield to the criminal may be 60 to 70 fraudulent cards per 100 transactions; the potential—tens to hundreds of thousands of cards.

Level 5 compromise—The criminal invades a terminal or system node with invasive program code (insider) or uses a fake terminal (outsider) to compromise both PIN and card information. Most likely the points of compromise are POS terminals, ATM or POS terminal processors, networks or switches. The cards at risk are 100% and the yield is 100%; the potential —depending upon the point of compromise, millions of cards.

D. PROBLEMS WITH CURRENT SOLUTIONS

The short term solution, truncating the card number on customer receipts, has several problems:

First, to fully implement it will require changes to software driving almost a million ATM and POS terminals which is expensive and will take at least 18 months to complete.

Second, these changes when fully implemented will only protect against Level 1 and 2 compromises.

The medium term solutions which protect the magnetic stripe, are estimated by industry sources at conservatively 300 to 500 million dollars and will take at least 5 years to completely implement. They have several problems:

First, to fully implement they will require at minimum physical changes to the card readers in almost a million ATM and POS terminals and to issuing bank software to store the additional security information.

Second, with a fraud risk estimated at 50 to 70 million dollars per year an investment of 300 to 500 million dollars does not balance the cost relative to the risk being managed.

Third, the technologies are not field proven in a scale environment and if compromised, there is no way to detect or measure the exposure or manage the fraud.

The long term solution is to replace the current magnetic striped cards with "smart" cards containing computer chips. Visa estimates a cost to the industry of over a billion dollars and that it will not find wide spread distribution for a decade or longer.

First, to fully implement they will require at minimum physical changes to the card readers in almost a million ATM and POS terminals and issuing FIs will have to reissue 150 million cards.

Second, with a fraud risk estimated at 50 to 70 million dollars per year an investment of over a billion dollars does not balance the cost relative to the risk being managed.

Third, the technologies are not field proven in a scale environment and if compromised, there is no way to detect the or measure the exposure or manage the fraud.

SUMMARY OF THE INVENTION

Therefore, an object of the current invention is to provide a computer system for detection and control of counterfeit debit card fraud which avoids the aforementioned disadvantages of the prior art.

Another object of the present invention is it not to be intrusive to bank and network processing, and implementable within six months.

A further object of the present invention is to provide flexible tools capable of identifying points of fraud and points of compromise, thereby allowing "at risk" cardholders to be identified and loss exposure to be limited.

Yet another object of the present invention is to be of national scope. National presence insures comprehensive coverage of card bases to detect fraudulent patterns which would not be possible if pursued on a local or regional basis.
A. FEATURES
The invention encompasses the following features Fraud Pattern Detection: The multi-financial institution nature of the service allows the detection of fraud patterns over a large geographical area among a number of FI card bases and ATMs.

Unreported Fraud: The analytical techniques utilized and subsequent follow-up facilitate the detection of suspected fraudulent transactions even before they are reported, perhaps even before cardholders realize their cards have been compromised.

Early Warning: The timely identification and reporting of fraud patterns provides FIs and networks with valuable additional response time.

Red Alert Service: Notification of correlations in activity suggesting suspected fraud is sent immediately to affected participant FIs. Card Alert staff then works interactively with FI and network personnel through complete identification and resolution of the problem.

Low Cost: Card Alert provides a comprehensive national detection, monitoring, and follow-up service at a cost far lower than less effective multiple regional and/or local services could deliver.

Software: The daily entry of fraud data and receipt of fraud alert reports by customers facilitated by a PC-based software package, including user guide, self-training tutorial.

Reporting Package: A comprehensive set of periodic reports showing fraud indices, peer group comparisons, and consolidated reports by region are provided to networks.

Fraud Incident Follow-Up: The service provides an interactive environment using daily E-mail and telephone conversations for inputs and updates on actual or suspected fraud incidents.

Professional Fraud Expertise: Card Alert staff includes trained and experienced professionals to coordinate and assist in the use of the information and reports provided by the service to follow up on suspected fraud incidents.

Contingency Plan Support: Card Alert provides FIs and network participants with a "generic" contingency plan which shows how Card Alert's services can be utilized in the event of a serious incident. This generic plan can be modified to meet the particular needs of FIs and networks.

B. BENEFITS

The following benefits and advantages accrue to Card Alert participants:

1. Financial institutions

Early Warning: Card Alert's timely notification of fraud conditions, often before the FI and/or even the customer recognizes it, provides FIs with valuable follow up time in the event of a serious incident.

Reduced Fraud Losses: The ability to address fraudulent situations early in the process cuts actual losses, and even more significantly, allows fraud conditions to be detected, investigated, and solved before they reach severe or "catastrophic" proportions. By discovering the point in the financial network where a compromise in security actually took place allows financial institutions to block or cancel all cards which were involved in a transaction through that point during the identified time frame before the compromised cards are necessarily used to steal funds.

Improved Customer Relations: Card Alert's ability to differentiate between patterned (multiple) fraud and individual incidents helps FIs in approaching/confronting customers who may have completed the transaction themselves or whose card may have been used by someone else in the customer's household. Importantly, Card Alert's service provides information that FIs may use to approach "at risk" customers who do not yet know their card numbers and PINs have been compromised.

Reduced Field Work: Card Alert's reporting services allow the FI to distinguish multiple fraud incidents from individual cases. Card Alert also tracks multiple fraud cases and coordinates follow-up, thereby reducing work on the part of FIs.

Low Cost: The comprehensive fraud detection and follow-up service provided by Card Alert is far more efficient and cost effective because it can view the crime from a multiple institution perspective rather than each FI trying to solve it on its own.

2. Networks

Actionable Management Information: Card Alert's periodic and, when required, daily reports provide networks with information necessary to trigger contingency plans if fraud is rising rapidly. National coverage furnishes far more comprehensive information (from national trends to pinpointed local incidents) than could be provided by services developed locally or regionally.

Solution to Long-Standing Problem: Card Alert addresses the need for action to address the growing problem of card fraud that network executives have long recognized.

Single Effective Solution: Card Alert offers a single, comprehensive solution with the national coverage necessary to be effective. This is achieved at a fraction of the cost to the industry of each network developing and operating systems with similar capabilities.

Enhanced Customer Relations: Card Alert provides networks with the ability to respond to a mounting FI demand without the need to allocate significant levels of scarce development and operating resources.

Neutrality: Card Alert's independent status and focus on preserving the confidentiality of FI data allow networks to have "arm's length" relationships with FI participants. Not handling this sensitive data directly results in lessened responsibility and liability for the networks. This independence and focus also facilitate the exchange of fraud pattern and other "anonymous" information (data with no reference to the submitting FI) among networks.

BRIEF DESCRIPTION OF THE DRAWINGS

FIG. 3 is a Block diagram of the flows in the identification of a Point of Compromise (POC); and FIGS. 4A–4I, collectively, are a flow diagram showing the detailed steps to determine the point of fraud (POF) and the point of compromise (POC) for financial cards.

DETAILED DESCRIPTION OF THE PREFERRED EMBODIMENTS

The Invention uncovers multiple card frauds and identifies "at risk" cardholders by utilizing a combination of system components and processes.

A. System Components

Figure 1:
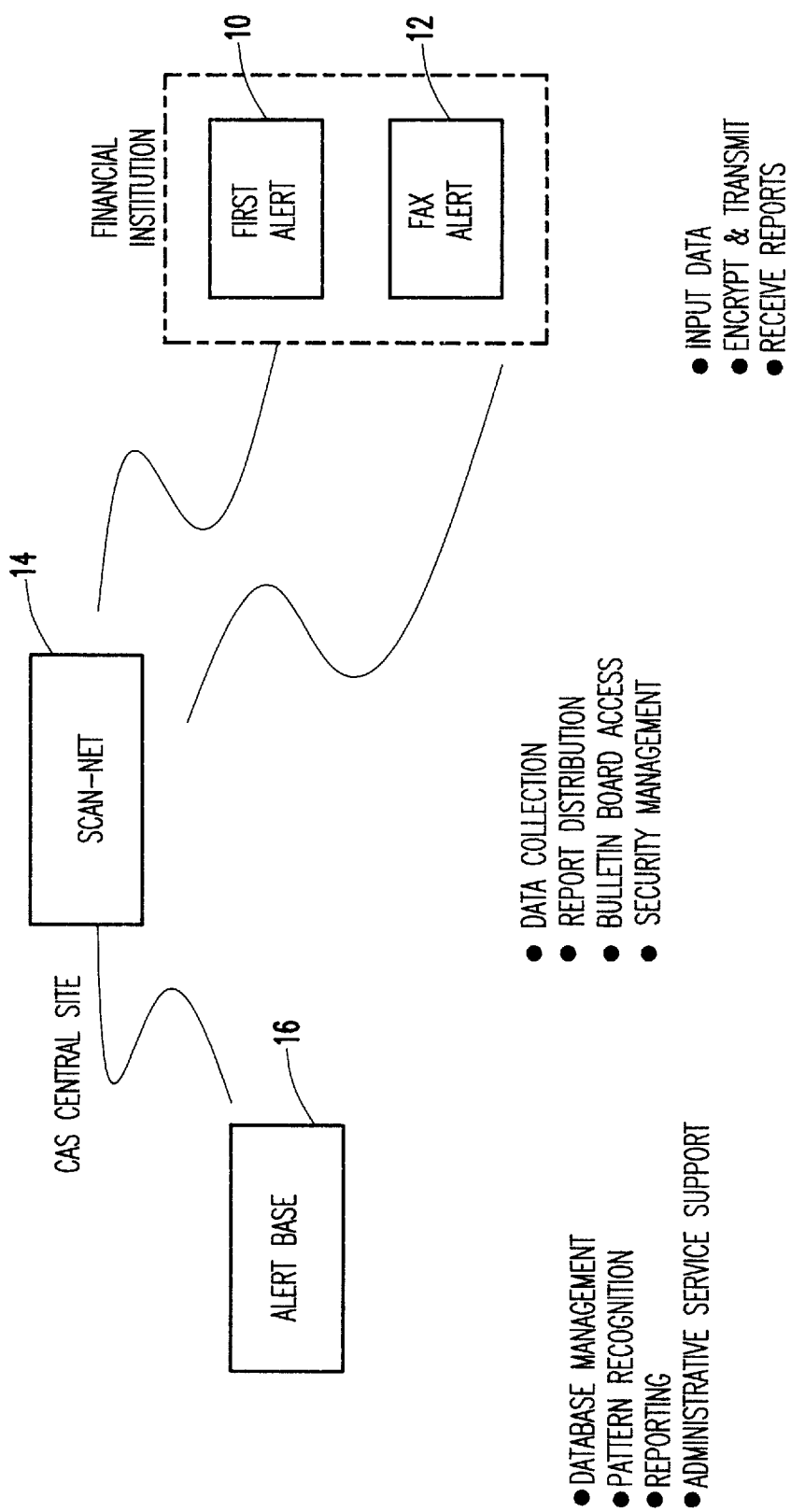
FIG. 1 is a block diagram of the relationships and functions of the participants and central site (Alert Base)

Referring now to FIG. 1, the Card Alert invention has three principal system components.

First Alert 10 is a software package licensed to FIs to enter and transmit transaction data and to receive service reports. FIs not having access to a personal computer compatible with First Alert communicates with Card Alert using a fax machine and a set of manual procedures called Fax Alert 12.

Scan-Net 14 is the communications interface that receives and logs transaction data from First Alert 10 and distributes outgoing reports into FI secure electronic mailboxes maintained by Card Alert. Scan-Net also manages fax images received from and sent to Fax Alert 12.

Alert Base 16 is the hub of the service responsible for supporting both administrative functions and end-of-day processing/analysis.

The raw material that drives the process is information on unauthorized withdrawal transactions reported by cardholders to their financial institution. Such transactions are covered by the Federal Reserve System's consumer protection regulation (Regulation E). The cardholder's FI typically records information on these unauthorized withdrawal transactions using documents called "Reg E" inquiry forms. The form is used by the FI internally to track the progress of its customer's claim. A copy of the form is transmitted to another FI if the transaction occurred on its ATM.

Each business day, personnel at the participant FIs' locations enter information on any newly reported unauthorized withdrawal transactions into a PC, using First Alert software 10 provided by Card Alert. This information is transmitted daily to Alert Base 16, where it is added to a data base containing previously reported, unresolved, unauthorized withdrawals.

B. Processes

Figure 2:
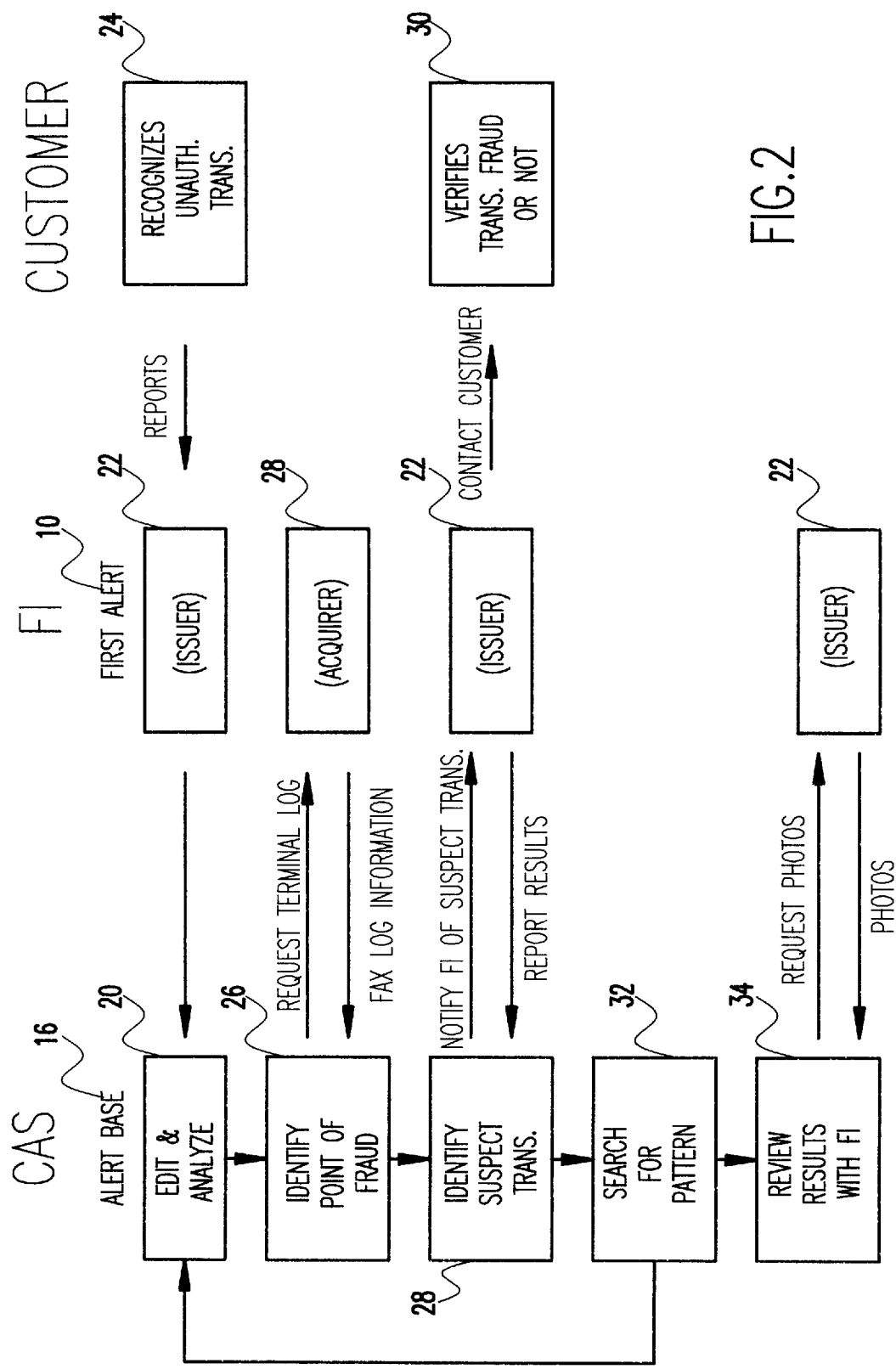
FIG. 2 is a block diagram of the flows in the identification of a Point of Fraud (POF)

The processes are system wide and involve specialized processing techniques that allow the service to identify the Point of Fraud (FIG. 2) and the Point of Compromise (FIG. 3).

1. Point of Fraud Processing—Referring now to FIG. 2, the purposes of this function are to identify where cards that are part of a multiple-card fraud are being used (the "point of fraud") and to identify all cards that are "in play" (fraudulent cards that have actually been used).

a. Edit and Analyze 20.
  i. FIs 22 forward to the system fraudulent transactions reported by their customers 24. At the time they are reported it is not known if these transactions are due to the compromise of a single card (traditional fraud) or multiple cards (counterfeit) by the thief.
  ii. As Alert Base 16 analyzes the data, patterns begin to appear if the card is part of a multiple card fraud.
  iii. These patterns help to isolate specific time periods and terminals or events.

b. Identify Point of Fraud 26.
  i. Once a multiple card event is identified a request goes out (terminal request log report) asking the terminal owner (acquirer) 28 to fax a copy of the relevant part of the journal log for that terminal. When the log is received at Alert Base 16, it is scanned into machine readable form and reviewed against the pattern file to select the suspect transactions.

c. Identify and process suspect transactions 28.
  i. The suspect transactions are sent out on the suspect transaction report to the card issuers 22 indicated on each suspect transaction record. The issuer calls their customer to determine if the fraud is real 30.
    (1) If it is, the transaction's status is set to "F" for fraud.
    (2) If it isn't, then the transaction's status is set to "C" to indicate it was performed by the customer.
    (3) The FI customer service representative reviews other current transactions on the customer's account with the customer to determine if any of these transactions are fraudulent. If other transactions are identified, they are also entered into First Alert 10. Before statusing the customer's account, the Customer Service Representative (CSR) also records the last issue date for the current card and includes it on the transaction.

d. Search for a pattern 32.
  i. When Alert Base 16 receives the results of the FI's investigation of these suspect transactions, it can evaluate how accurately it called the event by analyzing the number of transactions associated with the event that came back with a status code of "F" (Fraud) vs "C" (Customer Completed).
    (1) For every F, the analysis identified a customer who did not realize his/her card had been compromised, and thereby allowing the card issuer to limit the on-going losses on that card.
    (2) For every C, the analysis identified a transaction performed by a legitimate customer.
    (3) The ratio of F to C yields a "hit ratio," or Alert Base's success level for this event (key quality measure for the CAS service).
  ii. By grouping a series of related events, a pattern emerges that can be used to identify the thief's method of operation.
  iii. This information is then combined with new information received from the FI in the Edit and Analyze step 20 and the process begins again.
  iv. Other analysis techniques—As time passes and as the CAS service builds a file of historical fraud levels, it can detect increases that may be too small for an FI or network to detect. Cluster analysis based on geocoding is another technique to identify patterns of fraud.

e. Review results with FI 34.
  i. As a pattern of the fraud emerges, the results are reviewed with the FI whose cardholders have been compromised.
  ii. Based on the FI's decision to proceed and at its direction, CAS will assist in developing a case file to be shared with law enforcement authorities.

2. Point of Compromise Processing—Referring now to FIG. 2, the purposes of this function are to identify where the in play cards were compromised (the "point of compromise") (cards that are in the perpetrator's possession but not yet used).

a. Select a sample of in play cards.
  i. Before the sample is selected, all cards in play should be checked for reissue date. The FI has entered this date when this unauthorized withdrawal was first reported. As an example, if a card was issued only a month ago, the compromise more than likely occurred during that month.
  ii. Select a sample of fraudulent card numbers from the in play cards identified for the case under review
  iii. Sample should include a mix of cards from different regions, but more heavily weighted to out-of-area cardholders.
  iv. Sample size should be at least 20 cards or 5% of case whichever is greater.

b. Request transaction set from issuer for sample cards.
  i. All ATM/POS transactions (approved or declined) for sample cards going back for a period of time (e.g., 3 months).
  ii. Report is sent to issuer identifying cardholders and requesting all ATM/POS transactions for 3 months.
  iii. The issuer can either enter the transactions through First Alert or fax them to the service.

c. Edit and Analyze 38.
  i. Edits consist of comparisons to the reference codes and file look ups against the terminal data base to assure that all the transaction is available and consistent to zone map the transactions.
  ii. Zone mapping—The transactions are edited and then based on issuer and acquirer codes network zones are programmatically assigned. Example, Transaction is acquired by a bank in California, and authorized by bank in Pennsylvania. Path—California bank Terminal to western regional ATM switch to national network switch to eastern regional ATM switch to Pennsylvania Authorization center. (The path is determined by the presence of network pseudo-code in the terminal acquirer field.) Each segment of the path is a network zone and each node is a potential point of compromise.
  iii. Traffic Analysis—The sample transactions are now sorted and matched to identify common network zones
    (1) If significant matches are found, the results are printed for review by one of the analysts who looks for extenuating conditions before forwarding the information to the Confirmation analysis step 40.
    (2) If no significant matches are found, the program returns to the Request Transaction Set 38 and goes back another period (3 months)

iv. Extenuating conditions
   (1) Multiple sets of matches can indicate multiple points of compromise or just a coincidence since we are dealing with good transactions, the analyst will reconcile this situation, e.g., a fraudulent terminal.
   (2) If after 2 passes (6 months) no significant matches are uncovered, we may be dealing with a fake, or bogus terminal. If this is suspected, we will go back and request another 3 months of data, and we will also begin a parallel interview process with in play cardholders to determine if any unusual usage circumstances are remembered by the customer.
   (a) Zip Code Cluster analysis—select transaction date and terminal zip code to identify area and general time period to be covered in the interview. Out of area cardholders (specifically included in the sample) are key to this portion of the analysis. They were only in the area for a short period of time and most likely will remember more details.
   (b) Interview process will be conducted by the FI at our direction. The interview will be short and cover unusual circumstances (for example "new terminal") during a set period d. Conformation Analysis 40
   i. Having discovered a potential point of compromise we need to confirm it.
   ii. A new card sample is drawn and a set of transactions is selected for the period of suspected compromise.
   iii. These transactions go through the Edit and Analyze phase and will either confirm the prior analysis or cause us to reevaluate.
      (1) If they confirm the suspected point of compromise, the program moves on to the identify duration 42.
      (2) If these new transactions do not confirm point of compromise, the program returns to Extenuating Conditions (step c.4).

e. Identify Duration 42
   i. Examine the time range of usage of known fraudulent cards (from the sample) that occurred at the point of compromise to determine period of compromise. This is determined by identifying the earliest and latest transaction dates of the in play cardholder transactions identified in 1, above. ii. Since the period of compromise could extend over several days, or even weeks, the service would request to have copies of the log files express mailed to Alert Base by the acquiring FI or the processing node identified as the point of compromise.

f. Identify Suspect Cards 44.
   i. The log files are scanned into Alert Base for analysis.
   ii. The scanned transactions are compared to already known fraudulent transactions for this case; those that match are deleted from the log (these cards have already been reissued).
   iii. All fraudulent transactions for this case that do not match with the log file cards are put on a Request Specific Transaction Report and distributed through Scan-Net to all applicable card issuers. These cards will fall into one of two categories:
      (1) If the issuer confirms that the cardholder did perform a transaction at the point of compromise in the recent past, the information will be used to extend the duration and request additional log information from the acquiring FI, unless the transaction(S) fall within an already identified POC time range.
      (2) If the issuer states that this cardholder did not perform a transaction at the point of compromise, there may be multiple points of compromise since we have only been working with a sample of the fraudulent cards. These cards will form a new sample and the program returns to Request Transaction Set for Sample Cards (step 2.b).
   iv. Using the period of compromise identified in step e., the program selects transactions from the scanned log file and creates the suspect card report by issuing FI, and distributes them to each FI through Scan-Net.
   v. FIs receive the suspect card reports and reissue the card with a letter notifying the cardholder to begin using the new card 46 and by a set date, and as of that date "hot carding" the currently outstanding card.

g. Notes.
   i. While it seems that the FI has considerable work to do in this phase, it must be remembered that we are working with only a sample of the fraudulent cards, that the work is distributed among a number of FIs, and that this is an abnormal "fire drill" type of situation, not an everyday occurrence.
   ii. It is important to continue to test new in play fraudulent cards associated with this case against the identified points of compromise to be sure that there are not new points of compromise to be identified and/or that the duration of the fraud is not longer than suspected. This requires new "in play" card numbers being put through the specific transaction request process (step b). This report requests information on a transaction occurring at a specific terminal within a set time period.

Referring now to FIGS. 4A–4I there is shown a flow diagram showing the detailed steps to determine the point of fraud (POF) and the point of compromise (POC) for financial cards.

At block 50, as customers report unauthorized debit card transactions, the Financial Institutions (FIs) enter the information into the computer system via the First Alert Software. The card number, the terminal ID, and the date, time, and amount of the transaction are the only required fields. However, FI personnel are also requested to enter information such as Reg E Address and Last Issue Date of the card, if available. First Alert performs edit checks to ensure that data is entered correctly. For example, it will check the card number entered and see if the ISO is correct for this FI. If not, a warning will be issued but the incorrect ISO can still be added. The date is checked for reasonableness. Another edit check is a LUHN or Mod10 test to ensure that the card number is a valid number.

The transaction data entered is sent via modem or facsimile to a Card Alert Services central computer facility 52 where it is collected 54 and stored in a database 56. An edit routine is run once the data is received at the Central site. The edit routine is performed to ensure that the data makes sense before it is analyzed. For example, the FI may have entered cards with an ISO # not associated with that FI. The data is then analyzed at step 58 to determine if the FI added a new ISO # or if the card number is incorrect. Terminal IDs must also be verified for accuracy/consistency at this point and any exceptions are cleared.

Figure 4A:
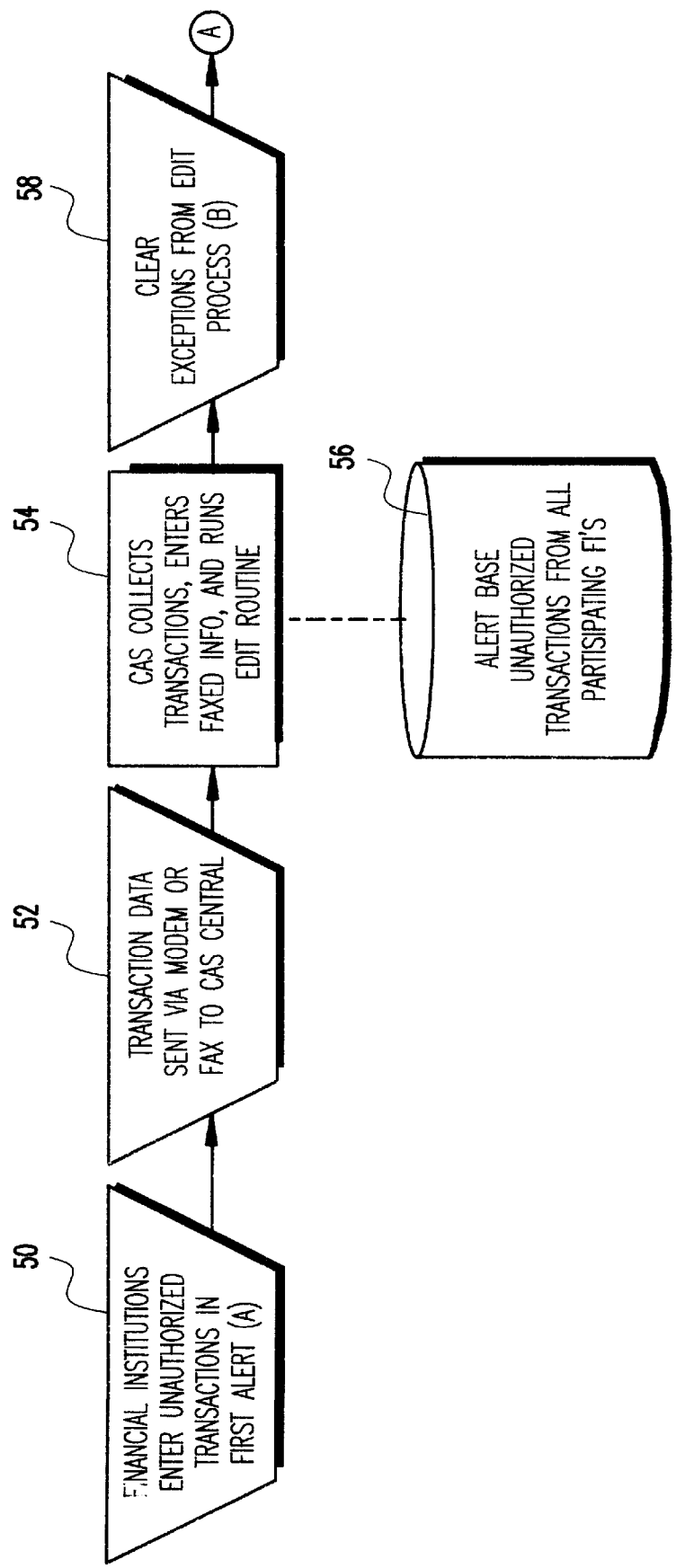
Figure 4B:
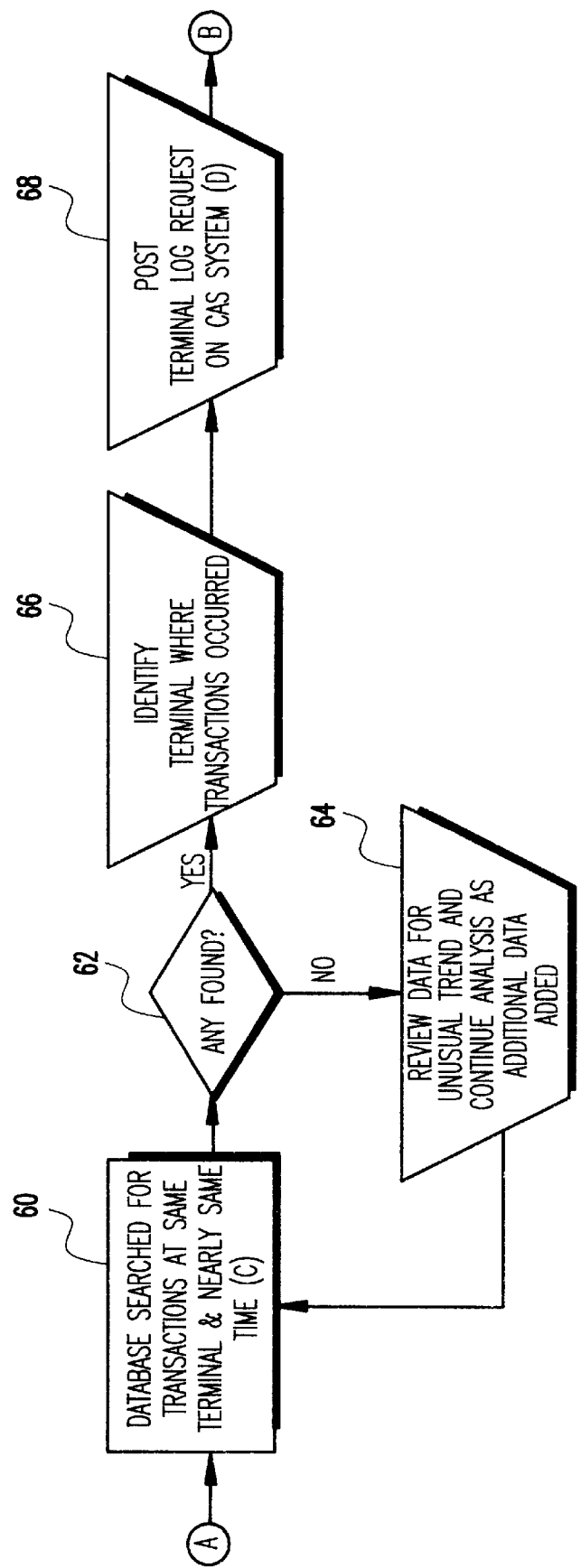

Continuing now to FIG. 4B, once the data has been edited, the Point of Fraud analysis begins at step 60. The analysis always begin with the assumption that multiple fraudulent transactions will occur at one terminal. This is because most ATMs limit the amount of funds which can be withdrawn with a single card in a day. Hence, a thief is likely to perform multiple transactions on the same machine using different cards. A second check is also in place which utilizes geocoding. A geosearch is conducted to identify transactions which occurred close in time within about an eight block geographic region. The CAS computer system searches the database for reported fraudulent transactions involving two different cards that occurred at the same terminal within a short time of each other or within the geographical region. The search window will normally be one hour. These transactions may have been reported by two different FIs or by the same FI. At decision block 62, if there are no transactions found, the data is continued to be analyzed at block 64 as new data is added. If, on the other hand, a suspect pair of transactions is identified, this is labeled a "hit" which will create a case number. It is then checked to see if it is part of an event at block 66. An event is a series of transactions at a terminal on a given date during a given time period.

Once a terminal is identified where more than one transaction occurred, the system will generate a request to the FI in charge of the terminal to supply a transaction log for that particular terminal at block 68. The request will be communicated to the FI via modem when the daily reports are sent. The financial institutions will be asked to supply a log encompassing one hour before the first suspicious transaction identified and one hour after the last suspicious transaction.

Figure 4C:
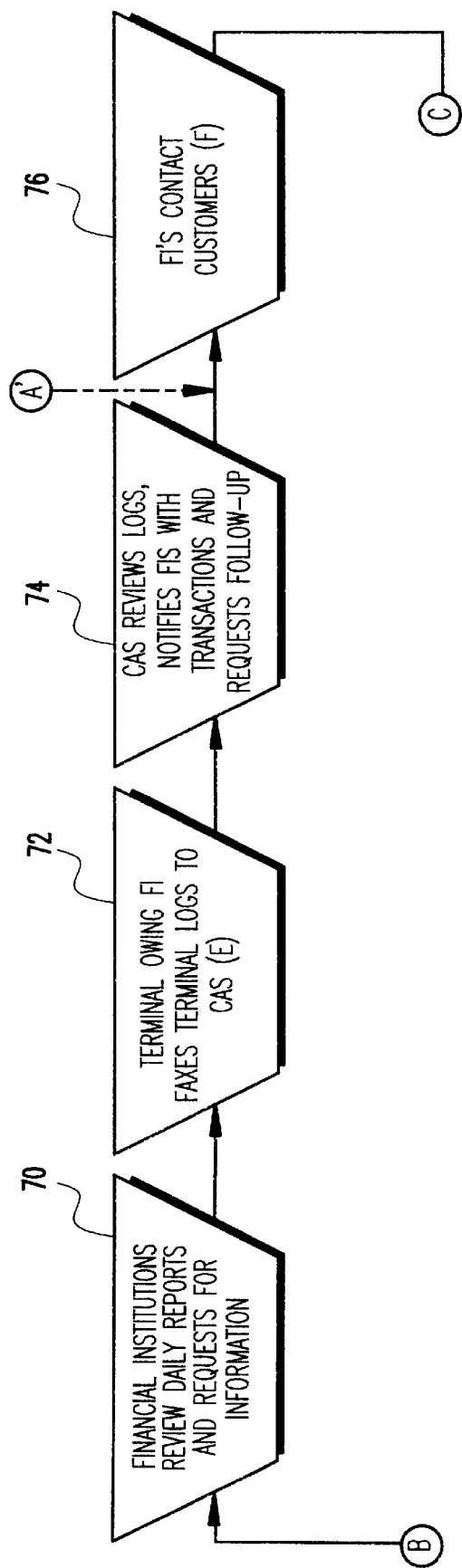

Referring now to FIG. 4C, on a daily basis, the FI reviews the First Alert system file for information requested by CAS the night before at block 70. The file sent by CAS also contains new BINs and terminal updates. The FI then faxes any information requested at block 72. If information has been requested from the FI, the request will show the specific information required. For example, if a terminal log has been requested, a Terminal Log Request will be present when the FI reviews First Alert. The log will state the terminal Id and the requested time frames. At block 74, when CAS receives the terminal log it is reviewed and the system generates a Suspect Transaction report for each FI who has cardholders utilizing the terminal close to the same time when the two unauthorized transactions occurred. At block 76, the FIs are requested to contact their customers to determine if they actually conducted a transaction at that terminal. The Suspect Transaction report is available on-line to the FI and can be updated as the Financial Institution receives the information.

Figure 4D:
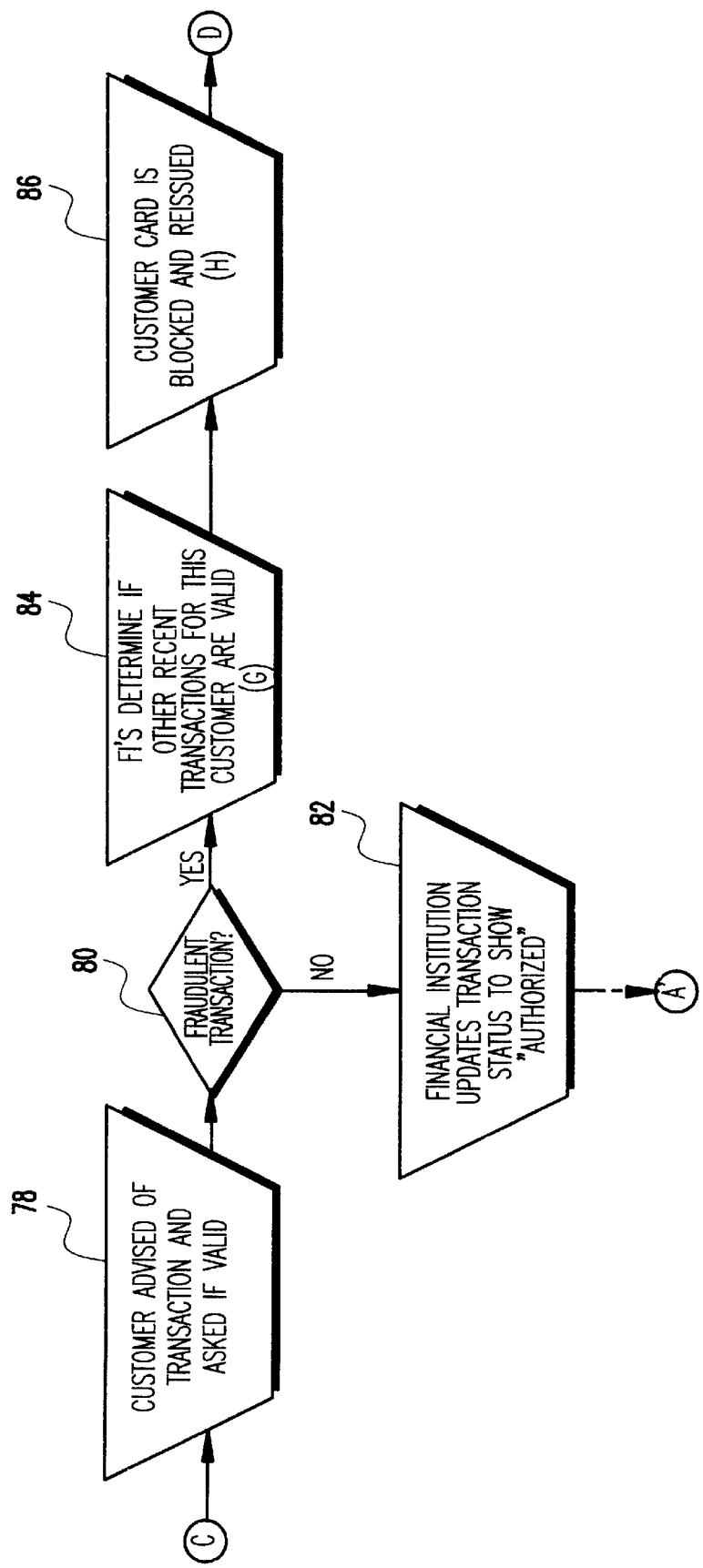
Figure 4E:
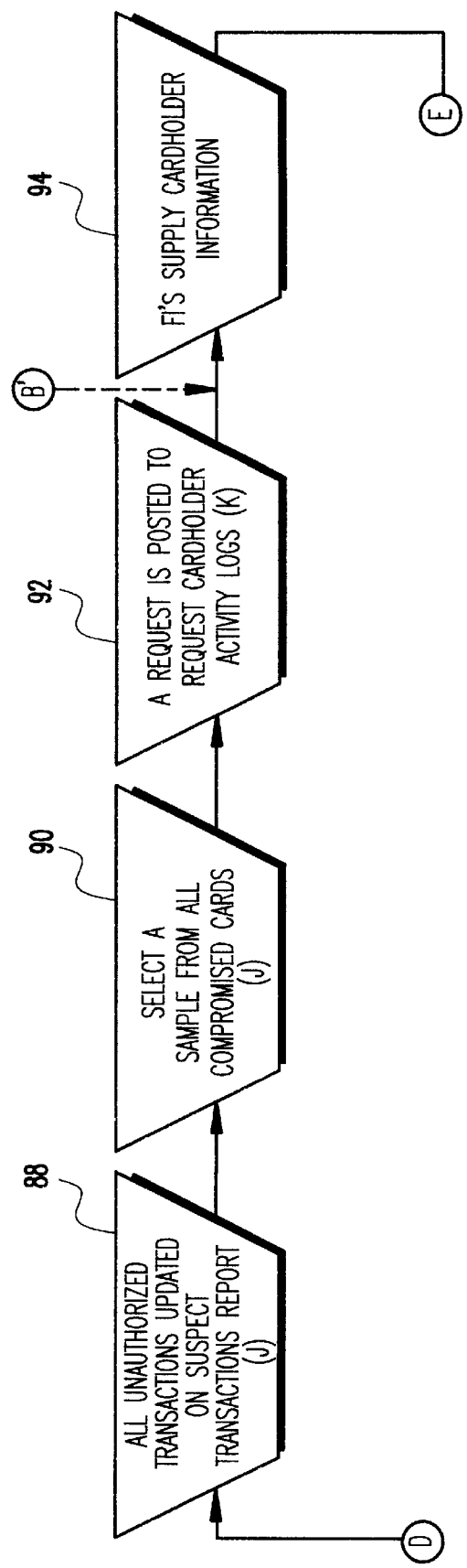
Figure 4F:
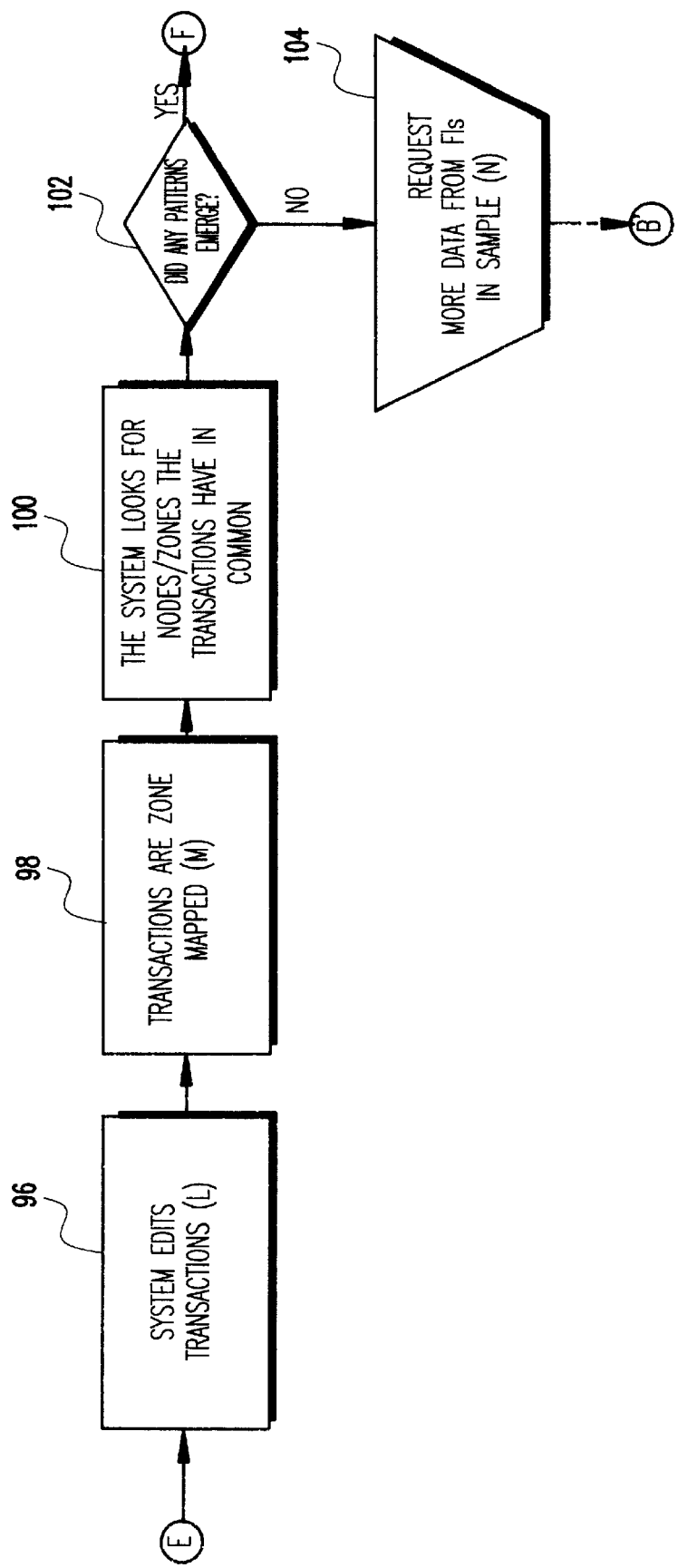
Figure 4G:
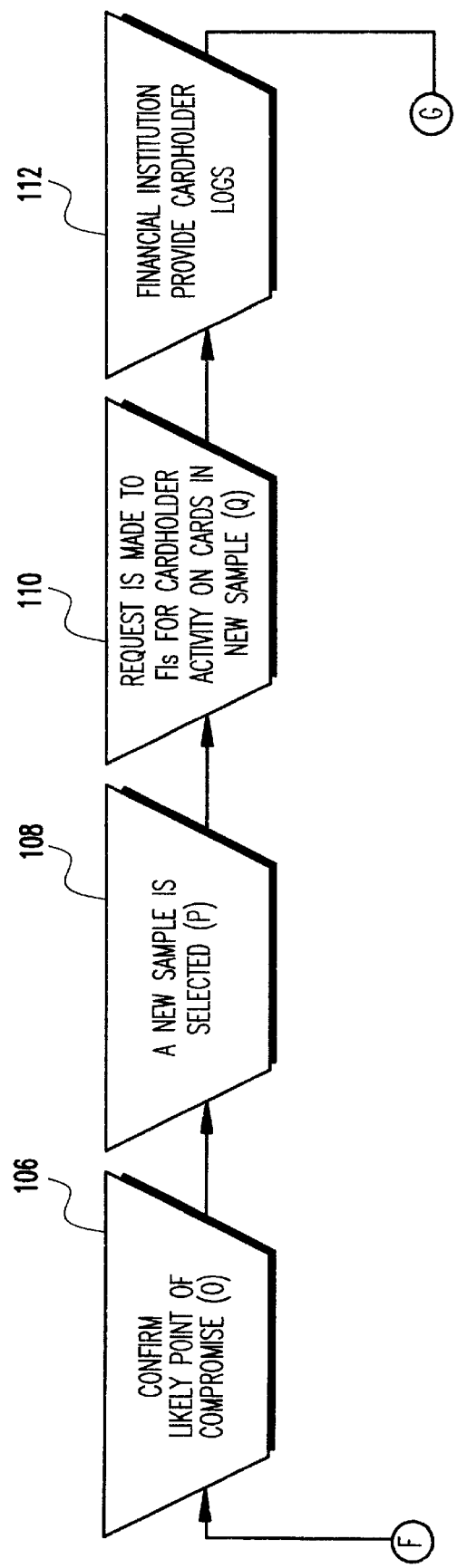
Figure 4H:
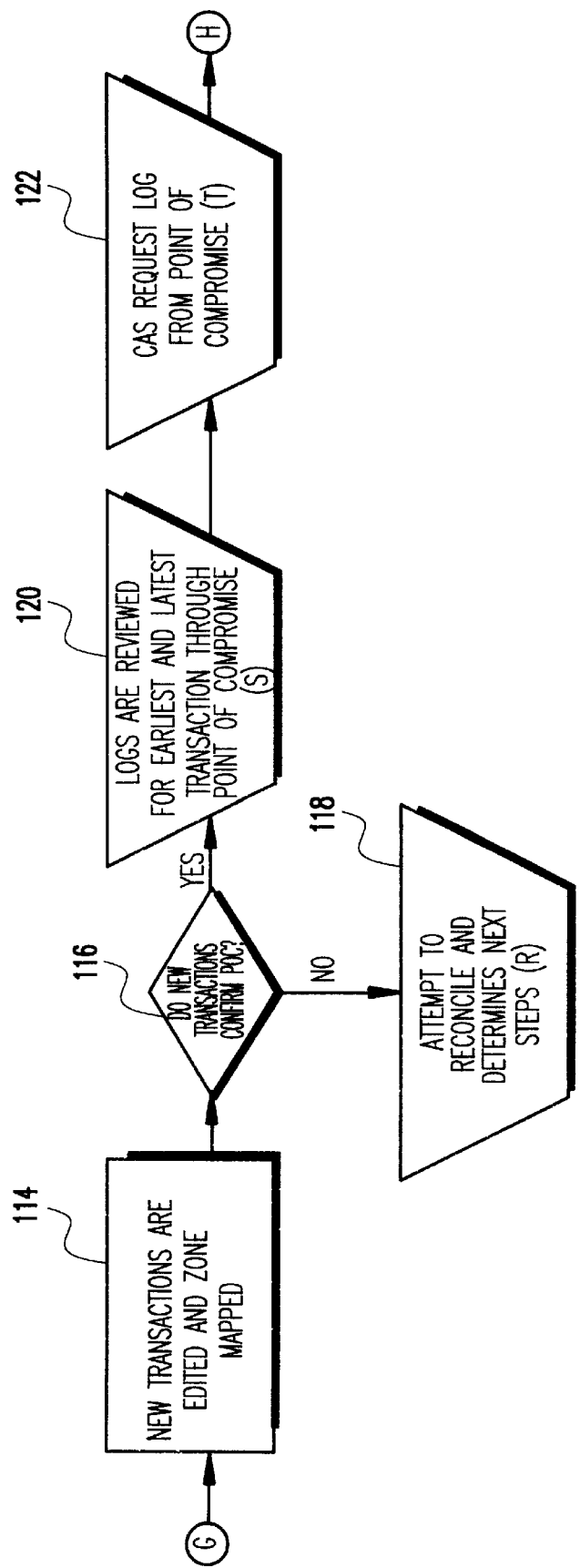
Figure 41:
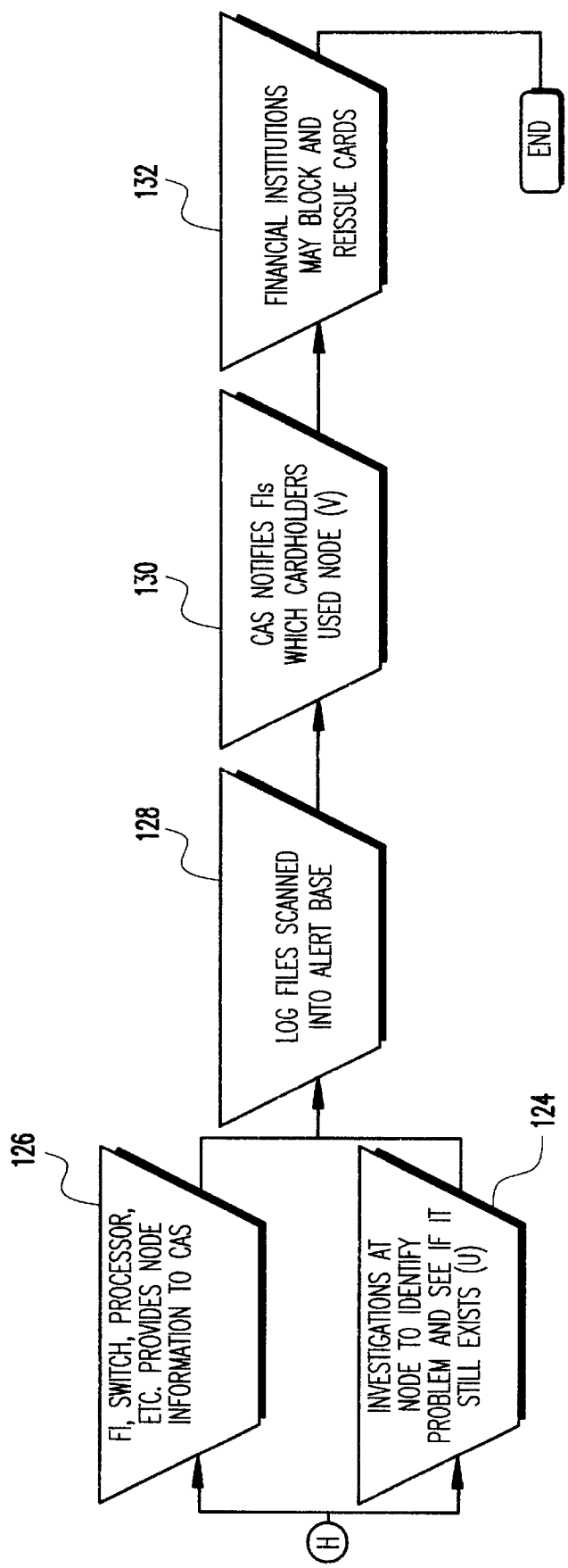

Continuing now to FIG. 4D, at block 78 the customer is polled as to whether the transaction was valid. At decision block 80, if the customer's transaction is valid, the FI updates the Suspect Transaction report to show that the customer completed the transaction and the transaction is "authorized" at block 82. At A', this step is repeated for each customer assigned a card having a number involved in a suspected fraudulent transaction. If the customer did not complete the transaction, then the FI representative will review other recent transactions for the customer's account to determine if the card has been used in other unauthorized transactions at block 84. At block 86, before the compromised card is blocked and a new card reissued, the issue date of the compromised card is noted. Continuing now to FIG. 4E, at block 88, if the customer's transaction is not valid, the FI updates the Suspect Transaction report to confirm that the transaction was unauthorized.

Once a determination has been made as to which transactions occurring at the terminal were fraudulent, a new phase in the fraud analysis process begins to determine the Point of Compromise for the cards. At block 90, sample of the greater of 20 cards or 5% of the fraudulent transactions is selected. Before the sample is selected, the last issue date of all the cards is reviewed to determine if one of them has a recent issue date which could serve to narrow down the time frame during which the compromise occurred. The card issuing institutions are also geographically coded. The sample selected is then weighed more heavily toward cards used fraudulently which are owned by out-of-town cardholders.

At block 92, the FIs are asked to supply all good transactions for the sample group over the last three months. The data can be entered into First Alert or faxed to CAS at block 94. This good transaction data will be reviewed to determine what all the transactions have in common in order to identify the point at which they may have been compromised.

At block 96, the good transactions for each cardholder in the sample are scanned in or entered into the CAS central system. The transactions are edited to ensure that the terminal IDs and other information are consistent and accurate. At block 98, the path of each transaction is determined or mapped to identify each node that the transaction passed through. Each node represents a potential point of compromise. The POC node may be a terminal, a processor, a switch, etc. The area between two nodes is called a zone. Thus, the process of identifying the transaction path is known as zone mapping. When all the transactions have been mapped, it is possible to determine the zones and nodes which the transactions have in common at block 100.

If, at decision block 102, no common nodes are identified, this may be an indication that the compromise occurred at an earlier time. To check out this theory, the Financial Institutions are asked to supply three more months of cardholder activity for cards in the sample at block 104 and the process loops back at B' to block 94 shown in FIG. 4E. Continuing now to FIG. 4G, if a common point is identified at decision block 102, through which all transactions traveled, the results are reviewed for accuracy and reasonableness and to confirm the analysis at block 106. At block 108, a new sample is selected in order to test the results derived from the first sample. Hence, at block 110, the Financial Institutions are again asked to provide three months of cardholder activity logs for their cardholders in the sample, which is entered into the system at block 112, If, at decision block 116, analysis of the new transactions does not confirm the Point of Compromise, the system must re-examine the data at block 118. If the new sample confirms the earlier analysis, then it is assumed that the Point of Compromise has been identified. The next step at block 120 involves identifying the time frame during which compromise may have occurred. From the subset of all good transactions which passed through the identified Point of Compromise, the earliest and latest transaction times are identified. These times are then used to define a window of time for possible compromise. Any transaction which passed through the POC node during this window of time may have caused the card owner's card to have been compromised. At block 122, a log is requested from the POC node to show all transactions which occurred at the node during the window of time identified.

Continuing now to FIG. 4I, at block 124, once a node has been identified as a Point of Compromise it can conduct its own internal investigations to determine the problem. For example, if a particular ATM has been identified as a POC then the FI driving the ATM will want to examine the terminal for evidence of tampering and attempt to identify how a security breach could have occurred. This information is requested and at block 126 and entered into the CAS system at block 128.

At block 130, the CAS system is used to notify each FI which has transaction through the POC during the identified time frame. This information is relayed to each Financial Institution's First Alert application on a Block and Reissue report at block 132. For example, if a particular ATM has been identified as a point of compromise during the first two weeks in November, then the financial institutions can cancel and reissue new ATM cards to all of their customers who used the compromised ATM during that time period thereby avoiding any actual fraud that may have been committed with counterfeit cards produced from information gleaned at the compromised ATM.

We claim:

1. A system for detecting unreported financial card fraud from incidences of reported past fraud, comprising:

a computer database comprising financial card fraud data reported from a plurality of financial institutions;

means for inputting said data into said computer database;

means for analyzing said fraud data to determine at least two incidences of reported fraud involving two different financial cards at a particular card machine during a common time period;

means for analyzing a segment of a journal for said particular card machine for transactions occurring during said common time period to determine possible instances of unreported fraud.

2. A system for detecting unreported financial card fraud as recited in claim 1 wherein said financial cards comprise magnetic stripe cards.

3. A system for detecting unreported financial card fraud, as recited in claim 1 wherein said financial cards comprise debit cards.

4. A system for detecting unreported financial card fraud, as recited in claim 1 wherein said common time period is less than an hour.

5. A system for detecting unreported financial card fraud, as recited in claim 1 further comprising means for analyzing said fraud data to determine reported fraudulent transactions involving two different financial cards which occurred close in time within a same geographic region.

6. A method for detecting unreported financial card fraud from incidences of reported past fraud, comprising the steps of:

inputting into a computer database financial card fraud data reported from a plurality of financial institutions;

analyzing said fraud data to determine at least two incidences of reported fraud involving two different financial cards at a particular card machine during a common time period;

analyzing a segment of a journal for said particular card machine for transactions occurring during said common time period to determine possible instances of unreported fraud; and reporting to said financial institution said possible instances of unreported fraud.

7. A method for detecting unreported financial card fraud, as recited in claim 6 wherein said financial cards comprise magnetic stripe cards.

8. A method for detecting unreported financial card fraud, as recited in claim 6 wherein said financial cards comprise debit cards.

9. A method for detecting a point of compromise in an electronic financial network from incidences of past reported financial card fraud, comprising the steps of:

selecting a sample of known counterfeit financial cards involved in fraudulent transactions;

requesting transaction records for a selected time period from all financial institutions whereat each of said known counterfeit financial cards in said sample was used;

mapping a path of each transaction to identify each node in said electronic financial network that said each transaction passed through; and determining common ones of said nodes to determine a point of compromise in said electronic financial network.

10. A method for detecting financial card fraud, as recited in claim 9 wherein said financial cards comprise magnetic stripe cards.

11. A method for detecting financial card fraud, as recited in claim 9 wherein said financial cards comprise debit cards.

12. A method for detecting a point of compromise in an electronic financial network as recited in claim 9 wherein said selected time period is at least three months.

13. A method for detecting a point of compromise in an electronic financial network as recited in claim 9 further comprising the step of canceling financial cards which conducted a transaction through said point of compromise.

* * * * *